United States Patent
Nguyen et al.

(10) Patent No.: US 8,326,680 B2
(45) Date of Patent: Dec. 4, 2012

(54) BUSINESS ACTIVITY MONITORING ANOMALY DETECTION

(75) Inventors: Kiet Nguyen, Durham, NC (US); Annapureddy S. Reddy, Research Triangle Park, NC (US); Arvind Srinivasan, Seattle, WA (US); Shubha S. Tangirala, Raleigh, NC (US)

(73) Assignee: International Business Machine Corporation, Armonk, NY (US)

( * ) Notice: Subject to any disclaimer, the term of this patent is extended or adjusted under 35 U.S.C. 154(b) by 204 days.

(21) Appl. No.: 12/778,916

(22) Filed: May 12, 2010

(65) Prior Publication Data
US 2011/0282715 A1 Nov. 17, 2011

(51) Int. Cl.
*G06Q 10/00* (2012.01)
(52) U.S. Cl. ..................................................... 705/7.41
(58) Field of Classification Search .................. 705/7.41
See application file for complete search history.

(56) References Cited

U.S. PATENT DOCUMENTS

| | | | |
|---|---|---|---|
| 5,659,731 A * | 8/1997 | Gustafson | 1/1 |
| 6,311,175 B1 | 10/2001 | Adriaans et al. | |
| 6,792,399 B1 * | 9/2004 | Phillips et al. | 705/36 R |
| 6,983,266 B1 * | 1/2006 | Goldschmidt | 706/52 |
| 7,523,053 B2 * | 4/2009 | Pudhukottai et al. | 705/30 |
| 7,568,019 B1 | 7/2009 | Bhargava et al. | |
| 7,657,545 B2 | 2/2010 | Bird | |
| 7,937,319 B2 * | 5/2011 | Kennis et al. | 705/38 |
| 2005/0251464 A1 * | 11/2005 | Ames et al. | 705/35 |
| 2008/0126413 A1 * | 5/2008 | Addleman et al. | 707/104.1 |
| 2008/0177689 A1 | 7/2008 | Jeng et al. | |
| 2009/0024408 A1 | 1/2009 | Wang et al. | |
| 2009/0083759 A1 | 3/2009 | Keil et al. | |
| 2009/0281977 A1 | 11/2009 | Allen et al. | |

OTHER PUBLICATIONS

Michael G. Alles, et al., "Audit Automation for Implementing Continuous Auditing: Principles and Problems," Rugers Business School (2008).*
E Koskivaara, "Artificial Neural Network Models for Predicting Patterns in Auditing Monthly Balances," 51 Journal of the Operational Research Society 1060-1069 (2000).*
John R. Kuhn, Jr. & Steve G. Sutton, "Continuous Auditing in ERP System Environments: The Current State and Future Directions" 24 Journal of Information Systems 91-112 (2010).*
Zabihollah Rezaee, et al., "Continuous Auditing: Building Automated Auditing Capability," 21 Auditing 147-163 (2002).*
Bezerra, Fabio; Anomaly Detection using Process Mining; Date: Jun. 8, 2009; Enterprise, Business-Process and Information Systems Modeling 10th International Workshop.
Iway; Activity Monitoring Technology; Download Date: Mar. 5, 2010; iWaySoftware.com; http://www.iwaysoftware.com/products/bam.html.

* cited by examiner

*Primary Examiner* — Peter Choi
(74) *Attorney, Agent, or Firm* — Libby Toub; Robert C. Rolnik

(57) ABSTRACT

An anomaly detector compares a first event from a business activity monitoring system to a second number from an independent trusted source, wherein the first event includes a first number. The anomaly detector determines that the first number from the business activity monitoring system is inconsistent with the second number. The anomaly detector generates a calibration relationship between first number and second number based on time, responsive to a determination that the first number is inconsistent with the second number. The anomaly detector stores the calibration relationship. The anomaly detector receives a third number from the business activity monitoring system at an interval after comparing the first number. The anomaly detector displays the third number to a dashboard. The anomaly detector displays a qualifier to the third number.

11 Claims, 5 Drawing Sheets

BUSINESS ACTIVITY MONITORING ANOMALY DETECTION

BACKGROUND OF THE INVENTION

1. Field of the Invention

The present invention relates generally to a computer implemented method, data processing system, and computer program product for confirming statistics. More specifically, the present invention relates to obtaining secondary sources for data collected concerning business processes.

2. Description of the Related Art

Businesses large and small rely on computers, computer networks, and electrical sensors to gather, aggregate and further process metrics concerning business processes. A business process is a quantifiable recurring or potentially recurring event that can measure strengths, weaknesses, opportunities, threats, typically in real-time or near real-time. Strengths and weaknesses can be measured by statistics concerning, for example, sales of particular items on a website owned or managed by the business, among other key process metrics. Opportunities and threats can be trends observable from various key process metrics or business statistics measured by a business.

Business activity monitoring (BAM) is the collection and aggregation of business activities within an organization from their sources initially recorded in a computer system under the control (as far as the business tracking data is concerned) of the organization. Among the benefits of BAM systems is the ability to collect data, often in real-time, and analyze the data so that the data can be presented to a dashboard. A dashboard is a high-level summary of the business processes monitored. In many cases, the dashboard is provided to a business executive on a display or other device of the executive's choosing.

Information concerning a business may be corrupted at a number of points in a BAM infrastructure. A BAM infrastructure is the collection of sensors, processors, network equipment and other information technology resources that collect, aggregate, synthesize and communicate status of the business. The BAM infrastructure is under the control of the business organization. Like many aspects of business, error may be introduced to a system by many of causes. Among these causes is widespread disruption from natural disasters, degraded sensors, faulty human data entries, soft errors, software defects, maintenance outages, hardware breakdowns, and the like. Each such error is more likely to be placed in a BAM infrastructure when such an infrastructure grows to have many components.

Accordingly, a BAM system can produce erroneous results to a dashboard. This anomalous situation can either create a false sense of security in an executive, or create panic and needless concern when there are gaps in data reporting that is observable in the dashboard, despite actual business-as-usual operations.

SUMMARY OF THE INVENTION

A computer implemented method, data processing system, and computer program product for responding to anomalies in a business activity monitoring system. An anomaly detector compares a first event from a business activity monitoring system to a second number from an independent trusted source, wherein the first event includes a first number. The anomaly detector determines that the first number from the business activity monitoring system is inconsistent with the second number. The anomaly detector generates a calibration relationship between first number and second number based on time, responsive to a determination that the first number is inconsistent with the second number. The anomaly detector stores the calibration relationship. The anomaly detector receives a third number from the business activity monitoring system at an interval after comparing the first number. The anomaly detector displays the third number to a dashboard. The anomaly detector displays a qualifier to the third number.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
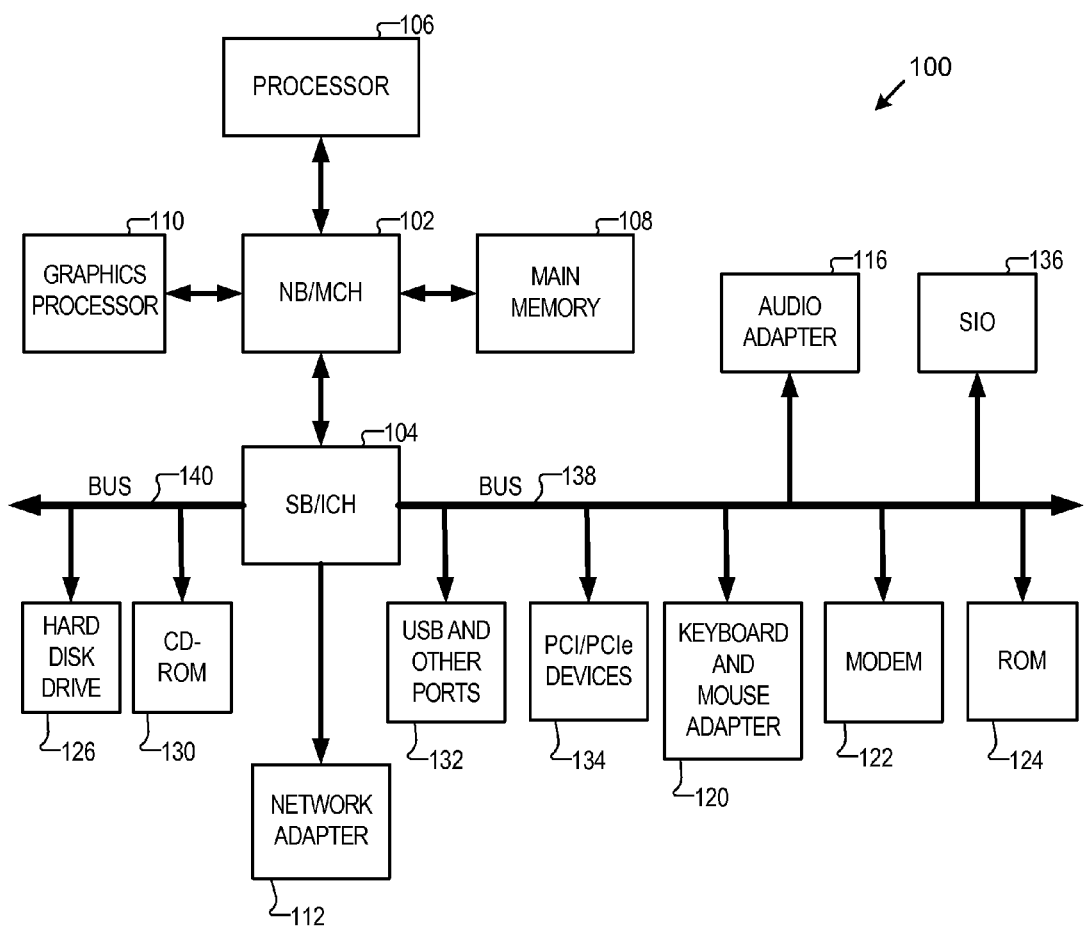
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a trademark of Sun Microsystems, Inc. in the United States, other countries, or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit a business executive to validate, supplement, and/or estimate data presented in a dashboard when independent trusted sources are available to provide a redundant flow of information to a dashboard. Apparent errors can be detected or alternatively confirmation is available to an executive. Accordingly, repairs and other remedial work can be ordered for a business activity monitoring infrastructure as needed to correct for anomalous data being reported to a dashboard and other problems.

Figure 2A:
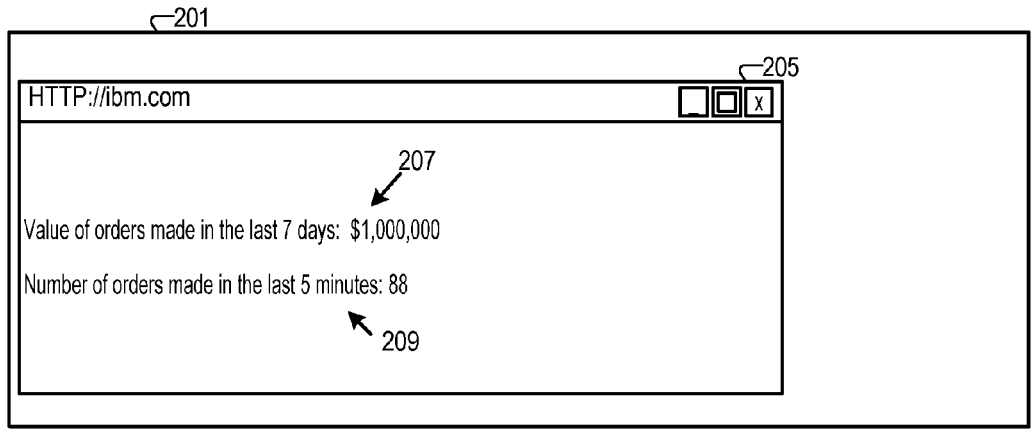
FIG. 2A is a picture of a dashboard without qualifiers in accordance with an illustrative embodiment of the invention.

FIG. 2A is a picture of a dashboard in accordance with an illustrative embodiment of the invention. Display 201 can provide a view of a dashboard to reflect real-time data collected from a business activity monitoring infrastructure. Dashboard 205 may be periodically updated with information concerning business activities. For example, some key process metrics monitored by the infrastructure may include the value of orders made in the previous seven days, such as report 207 or the number of orders made in the last five minutes in report 209. As shown, the number of orders in the past seven days is $1,000,000 and the number orders made in the last five minutes is 88.

Figure 2B:
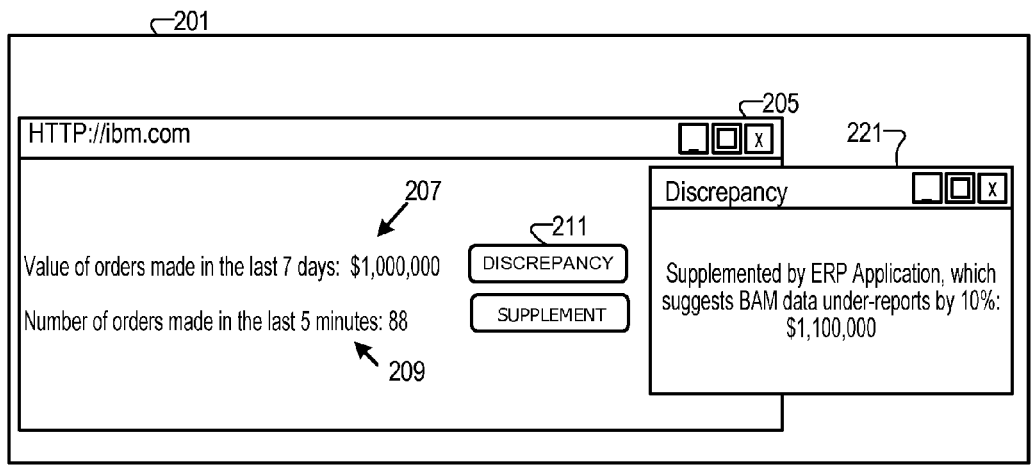
FIG. 2B is a picture of a dashboard with qualifiers and a discrepancy dialog box in accordance with an illustrative embodiment of the invention.

FIG. 2B is a block diagram of a dashboard with qualifiers and a discrepancy dialog box in accordance with an illustrative embodiment of the invention. The BAM information may appear in dashboard 205. In particular, discrepancy dialog button 211 operates as a qualifier to indicate that the associated BAM-reported data, ("Value of orders made in the last 7 days: $1,000,000), is not matching additional information. A qualifier is the degree to which a number is confirmed through an independent trusted source. The qualifier can be "checked", the qualifier can be "inconsistent", the qualifier can be an indicator along a spectrum that suggests that the number's relative proximity to any independently obtained number for the metric that the number measures/represents. The qualifier can include a description of an elapsed time since the BAM number was last checked and/or confirmed with the independently obtained number from an independent trusted source. In this case, the qualifier is the discrepancy dialog button, and any attendant pages or windows that are reached by clicking on the discrepancy dialog button.

An option control is a button or user input sequence that registers a user-input to select an option control.

A user-input may be received through keyboard, mouse or other means, that indicates that the user may request calibration numbers. Accordingly, the anomaly detector may receive a user-input corresponding to an option control An independent trusted source is a source for information that is not controlled by the business organization that controls the business activity monitoring infrastructure. The independent trusted source can contain hard facts verifiable using external data sources. Such external data sources can be a bank, an auditor, or a vendor. The data may be obtained in emails, websites or even data transcribed from written reports of the external data sources. The source and operation of the independent trusted sources is further explained in relation to FIG. 3.

Accordingly, in the example of FIG. 2B, the business organization is an online merchant. The dashboard 205 is rendered with a qualifier, discrepancy button 221, to display 201. The merchant periodically receives information outside the BAM infrastructure from a bank, "enterprise resource planning (ERP) application'". Thus, a report from ERP application suggests BAM data under-reports by 10%: $1,100,000. Report 207 states: Value of orders made in the last 7 days: $1,000,000. Accordingly, since this information is obtained from an independent trusted source, an anomaly detector renders discrepancy report 221, in a manner that shows the increase of $100,000 over report 207. In addition, the discrepancy report may show a ratio or other rule that states the variance present between numbers obtained from the BAM infrastructure as compared to the numbers obtained from the independent trusted source. The rule may be expressed as a calibration relationship. A calibration relationship is the relationship between the BAM data and the trusted independent source data. The calibration relationship may be a linear formula or a non-linear formula. In addition, the calibration relationship may apply estimation algorithms such as least-squares fitting of previously received data. Furthermore, time may be among the variables that the calibration relationship takes into account. In other words, if the independent trusted source provides reports with a protracted interval between reports, the calibration relationship may be used by an anomaly detector to interpolate and/or extrapolate trends to produce an interim number that operates in lieu of a current number from the independent trusted source.

The anomaly detector may supply discrepancy report 221 in response to operation of discrepancy button 211.

Figure 2C:
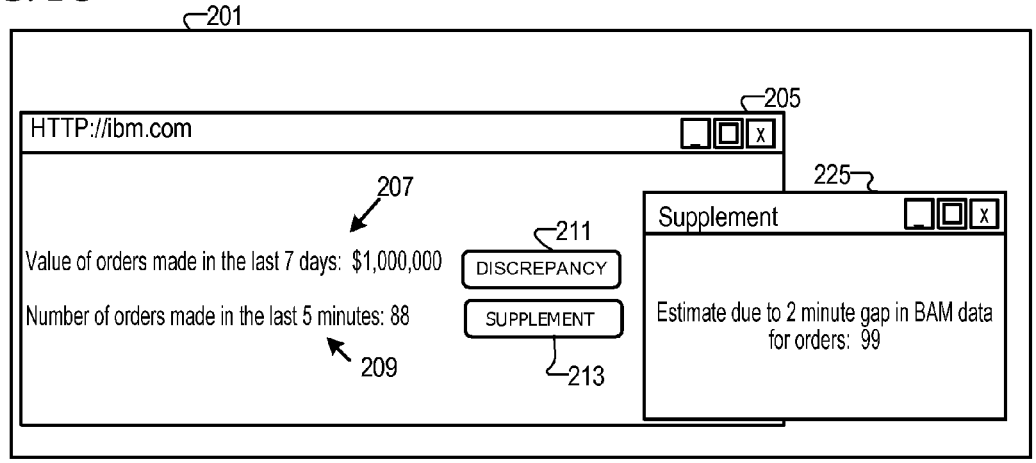
FIG. 2C is a picture of a dashboard with qualifiers and a supplemental dialog box in accordance with an illustrative embodiment of the invention.

FIG. 2C is a picture of a dashboard with qualifiers and a supplement dialog box in accordance with an illustrative embodiment of the invention. The dashboard 205 is rendered with a qualifier, supplement button 213, to display 201. The BAM originated report 209 is: "Number of orders made in the last five minutes: 88". However, historical data may be obtained that suggest that there has been a gap in real-time data that is too long to be produced by the previous patterns of order experienced at a server owned or controlled by the business organization. Accordingly, an anomaly detector may establish a hypothesis that data has gone unreported, or, if reported, has been corrupted in a manner that blocks the aggregation of that data. Consequently, the data may be filled-in by the anomaly detector applying statistics, heuristics and/or forecasting to determine that an addition 11 orders occurred during the apparent outage of the BAM infrastructure. Thus, the anomaly detector can provide supplemental report 225: "Estimate due to 2 minute gap in BAM data for orders: 99". The anomaly detector may supply supplemental report 225 in response to operation of supplement button 213.

Figure 3:
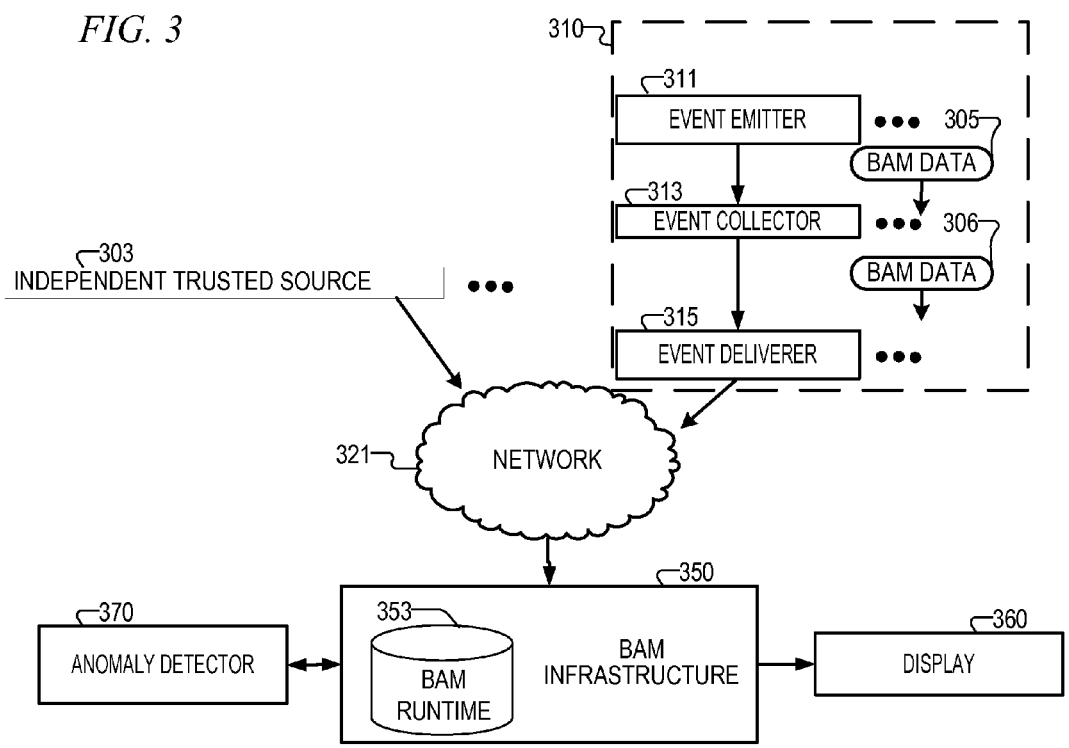
FIG. 3 is a block diagram of business activity monitoring infrastructure and independent trusted sources in accordance with an illustrative embodiment of the invention.

FIG. 3 is a block diagram of business activity monitoring infrastructure and independent trusted sources in accordance with an illustrative embodiment of the invention. BAM data 305 and BAM data 306 is data reported by event emitter 311. Event emitter 311 and other devices may form a business activity monitoring system. A business activity monitoring (BAM) system consists of the nodes of hardware that collect and further process BAM data for a BAM infrastructure. A business process may collect data through multiple event emitters. An event emitter is a device for recording environmental information. The event emitter can be a sensor that records weight, bar codes or any other physically detectable aspect of the environment. The event emitter can be a keyboard, mouse or any other conventional computer input device. The event emitters may provide BAM data that is multiplexed together by event collector 313. Further aggregation and/or analysis can be performed by event deliverer 315. Each event deliverer may rely on network 321 to further propagate the BAM data to BAM infrastructure 350. The event deliverer can filter information that arrives too frequently and summarize such data. In addition, the event deliverer can perform flow control to acknowledge inbound data reports and poll devices at the periphery of BAM infrastructure for status. The event deliverer may be able to detect faults in the network through the operation of checking for timeouts between intervals in order to confirm event emitter send data on schedule. Hardware and software components 310 may be additional BAM infrastructure.

BAM runtime 353 may further process numbers present in the data of the BAM infrastructure. In addition, anomaly detector 370 may correlate data received from independent trusted source 303 to BAM data. Data received from independent trusted sources may be one among several independent trusted sources. Anomaly detector 370 and BAM infrastructure 350 may cooperate to update dashboard within display 360 with reports concerning the business processes. It is appreciated that a dashboard can be provided by audio reports. Accordingly, a speaker is a suitable alternative to display 360, with respect to presenting dashboards.

Figure 4:
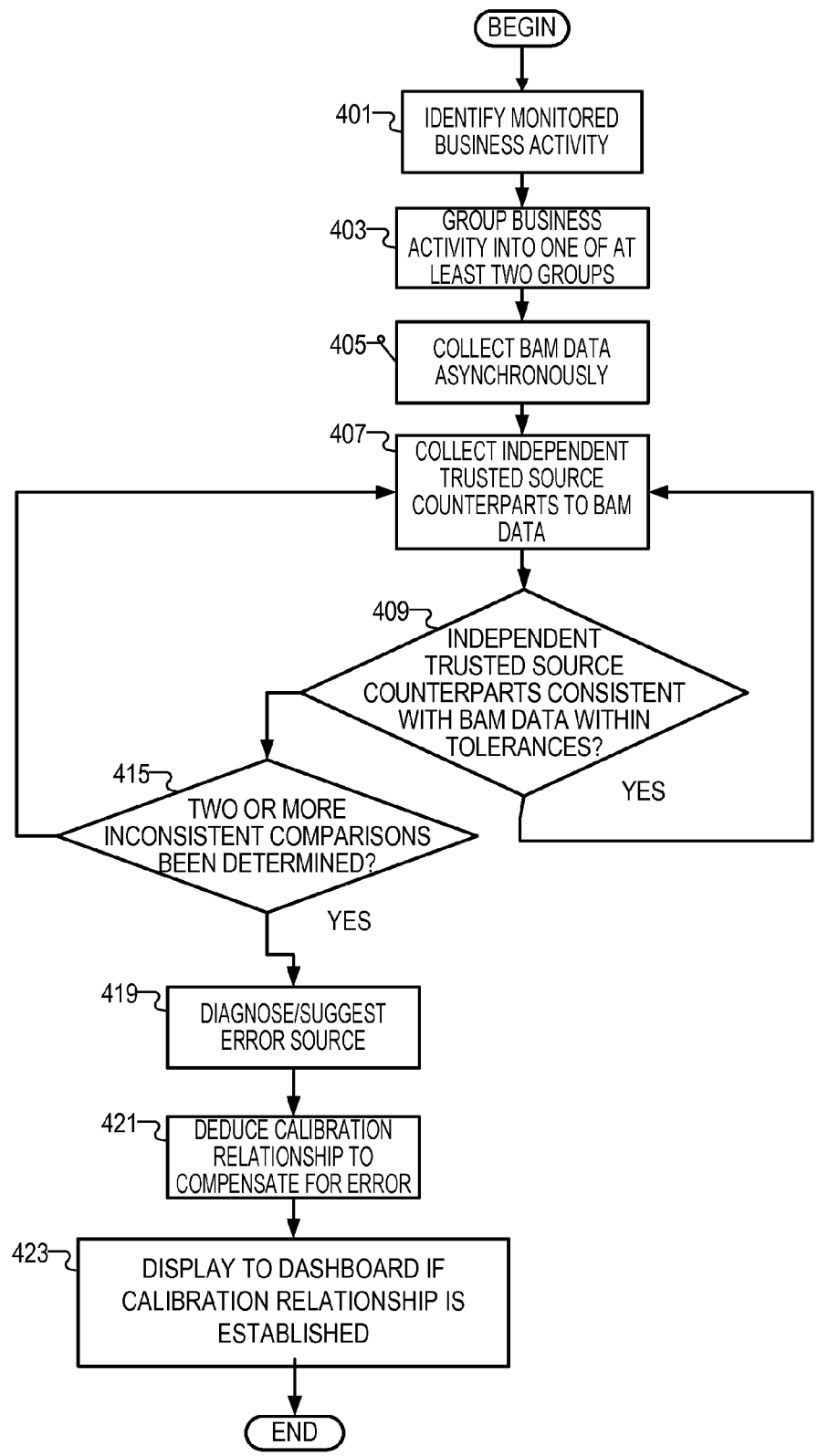
FIG. 4 is a flowchart in accordance with an illustrative embodiment of the invention.

FIG. 4 is a flowchart in accordance with an illustrative embodiment of the invention. Initially, an anomaly detector identifies monitored business activity (step 401). This step may be performed by a user interactively providing names of key process metrics. A user may further identify metrics using any suitable identifier, for example, with XML, universal unique identifiers, and the like. At this time, a user can specify independent trusted sources that may be used later by the anomaly detector to compare, confirm, calibrate and otherwise validate BAM data.

Next, the anomaly detector can group business activity into one of at least two groups (step 403). The groups can be a description of a statistic. In other words, the business activity can measure a number of orders. As such the data class for events describing the business activity can be "number of orders". A second example, is that a group can be order value. In which case, the data class for the events describing the business activity can be "order value". A data class, is type of information that the number or other metric measures.

Next, the anomaly detector may collect BAM data asynchronously (step 405). For example, the anomaly detector may receive a first event that includes a number concerning a business activity. The BAM data may be collected by a BAM system, for example as described in FIG. 3. Next, anomaly detector can collect independent trusted source counterparts to BAM data (step 407). Independent trusted source counterparts are data previously that has been described as being sources of information that can be matched to BAM data.

Next, the anomaly detector determines whether the independent trusted source counter parts are consistent with BAM data with respect to one or more tolerances (step 409). A tolerance is a margin of error specified as tolerable between a number expressed in BAM data and a independent trusted source counterpart. A tolerance can be expressed as a percentage of the BAM data. A tolerance can be set to zero. A positive determination repeats step 407.

After a negative determination, the anomaly detector may determine whether two or more inconsistent comparisons have been determined, with respect to a key process metric (step 415). The anomaly detector may estimate a calibration relationship on the basis of one or more inconsistent comparisons that takes as a variable input, time elapsed. Accordingly, the anomaly detector can establish a pattern from hypothetical BAM data and independent trusted source counterparts that, where the two forms of information diverge by 5% on a first day, and diverge by 10% on a second day, then each successive day, an additional 5% divergence can accumulate. The calibration relationship is the expected variation in BAM data based on previous independent trusted source counterparts. The calibration relationship may also be based on an interval, for example, an interval between a currently received BAM data and the receiving time of a previously received independent trusted source counterpart.

Next, the anomaly detector may diagnose or suggest an error source (step 419). For example, a deficit in a bank account may match a pattern of BAM data originated previously from a specific event emitter. Accordingly, the deficit may be attributed to a paucity in data arriving from the event emitter.

Next, the anomaly detector may deduce the calibration relationship to compensate for the error (step 421). As described earlier, the data arriving from both the BAM system and the independent trusted source may be fitted with linear relationships, non-linear relationships, and statistical estimations to reach a calibration relationship.

One way to deduce the calibration relationship is to accumulate two independent trusted source reports and determine the difference in a data class as reported by BAM events as compared to the independent trusted source report. If the reports occur on a schedule, the growth of differences from two consecutive reports can be extrapolated to estimate a current expected difference as compared to a BAM event.

Next, the anomaly detector may display to the dashboard the normal BAM data. For a data class that has a calibration relationship established, the anomaly detector may display a qualifier (step 423).

The qualifier can be accompanied by a calibration number that is determined, at least in part, on historical trends of the reporting of the data class. The calibration number can be made available in a pop-up dialog, such as described in FIGS. 2B and 2C.

Step 423 may operate to display the qualifier contingent on a difference or inconsistency being larger than a tolerance from the expected numbers given by a calibration relationship. Accordingly, if the difference is under a tolerance, for example, of 3% up or down, the anomaly detector may refrain from adding a qualifier to the dashboard. The tolerance can be set to measure a difference between a number of the BAM event and a number present in a report of the independent trusted source. The tolerance can be preset percentage per interval, where the interval is a duration between reports from the interdependent trusted source.

It is appreciated that responsive to receiving the user-input, the anomaly detector may display a calibration number based on a current time and the calibration relationship as part of step 423.

Figure 5:
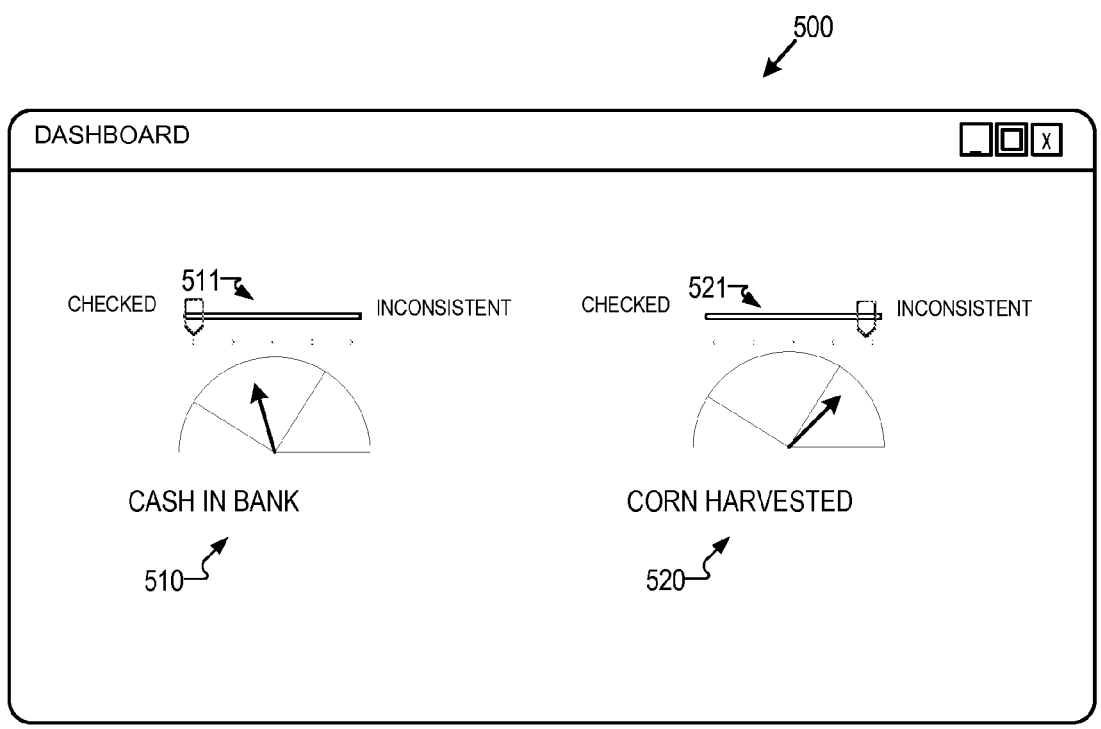
FIG. 5 is a picture of an alternative dashboard with graphical qualifiers in accordance with an illustrative embodiment of the invention.

FIG. 5 is an alternative dashboard with graphical qualifiers in accordance with an illustrative embodiment of the invention. Alternative dashboard 500 may display BAM event data for two data classes, for example cash in the bank 510 and corn harvested 520. The BAM data may be reported in a radial gauge format. A qualifier can indicate a level of consistency and conversely inconsistency that the dashboard reports for the BAM data in the data class. The qualifier can indicate gradations of consistency, for example, under 2% discrepancy with independent trusted source reports, under 4%, under 6%, under 8% and over 8%. As can be seen cash in bank qualifier 511 may report under 2% discrepancy. In contrast, corn harvested qualifier 521 may report the maximum inconsistency, for example, over 8%. A slider for either qualifier may take positions at intervening points in the qualifier scale to indicated greater or lesser inconsistencies.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for responding to anomalies in a business activity monitoring system, the method comprising:
  comparing, using a computer, a first event from the business activity monitoring system to a second number from an independent trusted source, wherein the first event includes a first number;
  applying a tolerance that permits a divergence between the first number and the second number by a present percentage per interval, wherein the tolerance accumulates over time;
  determining, using the computer, that the first number from the business activity monitoring system is inconsistent with the second number, in response to a difference between the first and second number exceeding the tolerance;
  responsive to a determination that the first number is inconsistent with the second number, generating, using the computer, a calibration relationship between the first number and the second number based on time;
  storing, using the computer, the calibration relationship;
  receiving, using the computer, a third number from the business activity monitoring system at an interval after comparing the first number, wherein the third number is extrapolated based on the calibration relationship;

displaying, using the computer, the third number to a dashboard;

displaying, using the computer, a qualifier to the third number, wherein the qualifier is an indication of degree of reliability;

receiving a user-input corresponding to an option control, where the option control is matched to the qualifier; and responsive to receiving the user-input, displaying a calibration number based on a current time and the calibration relationship, wherein the calibration number is determined, at least in part, based on historical trends of reports of the data class of the first number.

2. The computer implemented method of claim 1, wherein the first event occurs at a first time, and wherein generating the calibration relationship is based on a fourth number from the business activity monitoring system and a fifth number from the independent trusted source, wherein the fourth number corresponds to second event occurring at a second time.

3. The computer implemented method of claim 2, wherein the second number is an aggregation of multiple events.

4. The computer implemented method of claim 1, wherein the interval is a number of reported events.

5. A computer program product for responding to anomalies in a business activity monitoring system, the computer program product comprising:

a computer readable storage device having computer readable program code embodied therewith, the computer readable program code comprising:

computer readable program code configured to compare a first event from the business activity monitoring system to a second number from an independent trusted source, wherein the first event includes a first number;

computer readable program code configured to apply a tolerance that permits a divergence between the first number and the second number by a present percentage per interval, wherein the tolerance accumulates over time;

computer readable program code configured to determine that the first number from the business activity monitoring system is inconsistent with the second number, in response to a difference between the first and second number exceeding the tolerance;

computer readable program code configured to generate a calibration relationship between the first number and second number based on time, responsive to a determination that the first number is inconsistent with the second number;

computer readable program code configured to store the calibration relationship;

computer readable program code configured to receive a third number from the business activity monitoring system at an interval after comparing the first number;

computer readable program code configured to display the third number to a dashboard, wherein the third number is extrapolated based on the calibration relationship;

computer readable program code configured to display a qualifier to the third number, wherein the qualifier is an indication of degree of reliability computer readable program code configured to receive a user-input corresponding to an option control, where the option control is matched to the qualifier; and computer readable program code configured to display a calibration number based on a current time and the calibration relationship, responsive to receiving the user-input, wherein the calibration number is determined, at least in part, based on historical trends of reports of the data class of the first number.

6. The computer program product of claim 5, wherein the first event occurs at a first time, and wherein generating the calibration relationship is based on a fourth number from the business activity monitoring system and a fifth number from the independent trusted source, wherein the fourth number corresponds to second event occurring at a second time.

7. The computer program product of claim 6, wherein the second number is an aggregation of multiple events.

8. The computer program product of claim 5, wherein the interval is a number of reported events.

9. A data processing system comprising:

a bus;

a storage device connected to the bus, wherein computer usable code is located in the storage device;

a communication unit connected to the bus; and a processing unit connected to the bus, wherein the processing unit executes the computer usable code for responding to anomalies in a business activity monitoring system, wherein the processing unit executes the computer usable program code to compare a first event from the business activity monitoring system to a second number from an independent trusted source, wherein the first event includes a first number; computer readable program code configured to apply a tolerance that permits a divergence between the first number and the second number by a present percentage per interval, wherein the tolerance accumulates over time; computer readable program code configured to determine that the first number from the business activity monitoring system is inconsistent with the second number, in response to a difference between the first and second number exceeding the tolerance; computer readable program code configured to generate a calibration relationship between the first number and the second number based on time, responsive to a determination that the first number is inconsistent with the second number; computer readable program code configured to store the calibration relationship; computer readable program code configured to receive a third number from the business activity monitoring system at an interval after comparing the first number, wherein the qualifier is an indication of degree of reliability; computer readable program code configured to display the third number to a dashboard, wherein the third number is extrapolated based on the calibration relationship; computer readable program code configured to display a qualifier to the third number, wherein the qualifier is an indication of degree of reliability; computer readable program code configured to receive a user-input corresponding to an option control, where the option control is matched to the qualifier; and computer readable program code configured to display a calibration number based on a current time and the calibration relationship, responsive to receiving the user-input, wherein the calibration number is determined, at least in part, based on historical trends of reports of the data class of the first number.

10. The data processing system of claim 9, wherein the first event occurs at a first time, and wherein generating the calibration relationship is based on a fourth number from the business activity monitoring system and a fifth number from the independent trusted source, wherein the fourth number corresponds to the second event occurring at a second time.

11. The data processing system of claim 10, wherein the second number is an aggregation of multiple events.

* * * * *